United States Patent
Ohta et al.

(10) Patent No.: US 11,146,203 B2
(45) Date of Patent: Oct. 12, 2021

(54) MOTOR CONTROL APPARATUS

(71) Applicants: HONDA MOTOR CO., LTD., Tokyo (JP); KEIHIN CORPORATION, Tokyo (JP)

(72) Inventors: Kazuyuki Ohta, Wako (JP); Shinichi Yataka, Wako (JP); Daisuke Hoshino, Wako (JP); Yusaku Suzuki, Wako (JP); Yoshihiro Ito, Wako (JP); Takashi Sugawara, Wako (JP); Hirohito Ide, Utsunomiya (JP)

(73) Assignees: HONDA MOTOR CO., LTD., Tokyo (JP); KEIHIN CORPORATION, Tokyo (JP)

( * ) Notice: Subject to any disclaimer, the term of this patent is extended or adjusted under 35 U.S.C. 154(b) by 277 days.

(21) Appl. No.: 16/291,027

(22) Filed: Mar. 4, 2019

(65) Prior Publication Data
US 2019/0280636 A1   Sep. 12, 2019

(30) Foreign Application Priority Data

Mar. 7, 2018   (JP) .............................. JP2018-041252

(51) Int. Cl.
| | |
|---|---|
| *H02P 27/12* | (2006.01) |
| *H02P 27/08* | (2006.01) |
| *H02M 7/44* | (2006.01) |
| *H02P 6/185* | (2016.01) |
| *H02M 7/5395* | (2006.01) |
| *H02M 1/12* | (2006.01) |

(52) U.S. Cl.
CPC .............. *H02P 27/12* (2013.01); *H02M 7/44* (2013.01); *H02M 7/5395* (2013.01); *H02P 6/185* (2013.01); *H02P 27/085* (2013.01); *H02M 1/12* (2013.01)

(58) Field of Classification Search
CPC ............................ H02P 27/12; H02M 7/5395
USPC ............................... 318/400.02, 400.01, 700
See application file for complete search history.

(56) References Cited

U.S. PATENT DOCUMENTS

| | | | | |
|---|---|---|---|---|
| 4,994,978 | A * | 2/1991 | Kawamura | G05B 19/253 318/561 |
| 5,608,640 | A * | 3/1997 | Itoh | G05B 19/231 700/188 |
| 10,693,410 | B2 * | 6/2020 | Yoshida | B60L 50/51 |

FOREIGN PATENT DOCUMENTS

JP   2009-284719   12/2009

* cited by examiner

*Primary Examiner* — David Luo
(74) *Attorney, Agent, or Firm* — Amin, Turocy & Watson, LLP

(57) ABSTRACT

A motor control apparatus drives an inverter which supplies and receives electric power with respect to a motor by pulse width modulation. The motor control apparatus sets a frequency of a carrier such that a frequency of a sideband wave component of the carrier which is used for the pulse width modulation and a frequency of a predetermined rotation order of the motor become different from each other.

4 Claims, 3 Drawing Sheets

MOTOR CONTROL APPARATUS

CROSS-REFERENCE TO RELATED APPLICATION

Priority is claimed on Japanese Patent Application No. 2018-041252, filed on Mar. 7, 2018, the contents of which are incorporated herein by reference.

BACKGROUND

Field of the Invention

The present invention relates to a motor control apparatus.

Background

In the related art, a control apparatus is known which controls an inverter that drives a motor by a pulse width modulation (PWM). In this control apparatus, when harmonic components (frequencies of carrier sideband waves) around a carrier frequency and an eigenfrequency of the motor are matched with each other, a problem in that noise is increased due to a resonance of the motor occurs. In response to the problem, in order not to match the frequencies of carrier sideband waves and the eigenfrequency of the motor, for example, when increasing the carrier frequency or changing the eigenfrequency of the motor, there is a possibility that a cumbersome work such as a change of a switching element that constitutes the inverter or a change of the structure of the motor is required. In response to the problems, in order not to match the frequencies of carrier sideband waves and the eigenfrequency of the motor without changing the configuration of the inverter or the structure of the motor, a control apparatus is known which switches the carrier frequency in accordance with the rotation number of the motor (for example, refer to Japanese Patent Application, Publication No. 2009-284719A).

SUMMARY

At the time of power distribution to the motor according to the related art described above, in a rotation order (for example, a least common multiple of the number of magnetic poles and the number of slots, and the like) in accordance with the number of magnetic poles and the number of slots of the motor, a torque ripple (torque pulsation) in addition to an electromagnetic excitation force in a radial direction occurs. An eigen-oscillation mode by the electromagnetic excitation force in the radial direction is, for example, an annular zero-order mode that oscillates in phase in the radial directions or the like. When the frequencies of carrier sideband waves are matched with the frequency of the rotation order at which the torque ripple occurs similarly to such an eigenfrequency of the motor, a problem in that noise is increased also occurs.

An aspect of the present invention provides a motor control apparatus capable of preventing noise that occurs at the time of power distribution to a motor from being increased.

(1) A motor control apparatus according to an aspect of the present invention drives an inverter which supplies and receives electric power with respect to a motor by pulse width modulation. The motor control apparatus includes a carrier frequency setting part that sets a frequency of a carrier such that a frequency of a sideband wave component of the carrier which is used for the pulse width modulation and a frequency of a predetermined rotation order of the motor become different from each other.

(2) In the motor control apparatus (1) described above, the predetermined rotation order may be a rotation order at which a torque ripple occurs at the motor in accordance with a number of magnetic poles and a number of slots of the motor.

(3) In the motor control apparatus (2) described above, the carrier frequency setting part may set, in a state where the frequency of the carrier is changed synchronously with a rotation number of the motor, the frequency of the carrier such that the frequency of the sideband wave component and the frequency of the predetermined rotation order become different from each other.

According to the configuration (1) described above, it is possible to prevent noise caused by the frequency of the sideband wave component of the carrier and the frequency of the predetermined rotation order of the motor being matched with each other from being increased.

According to the configuration (2) described above, it is possible to prevent noise caused by the torque ripple that occurs in accordance with the number of magnetic poles and the number of slots of the motor from being increased.

According to the configuration (3) described above, it is possible to further effectively prevent noise from being increased in a control mode in which the frequency of the sideband wave component of the carrier and the frequency of the predetermined rotation order of the motor are easily matched with each other.

DESCRIPTION OF THE EMBODIMENTS

Hereinafter, a motor control apparatus according to an embodiment of the present invention will be described with reference to the accompanying drawings.

Figure 1:
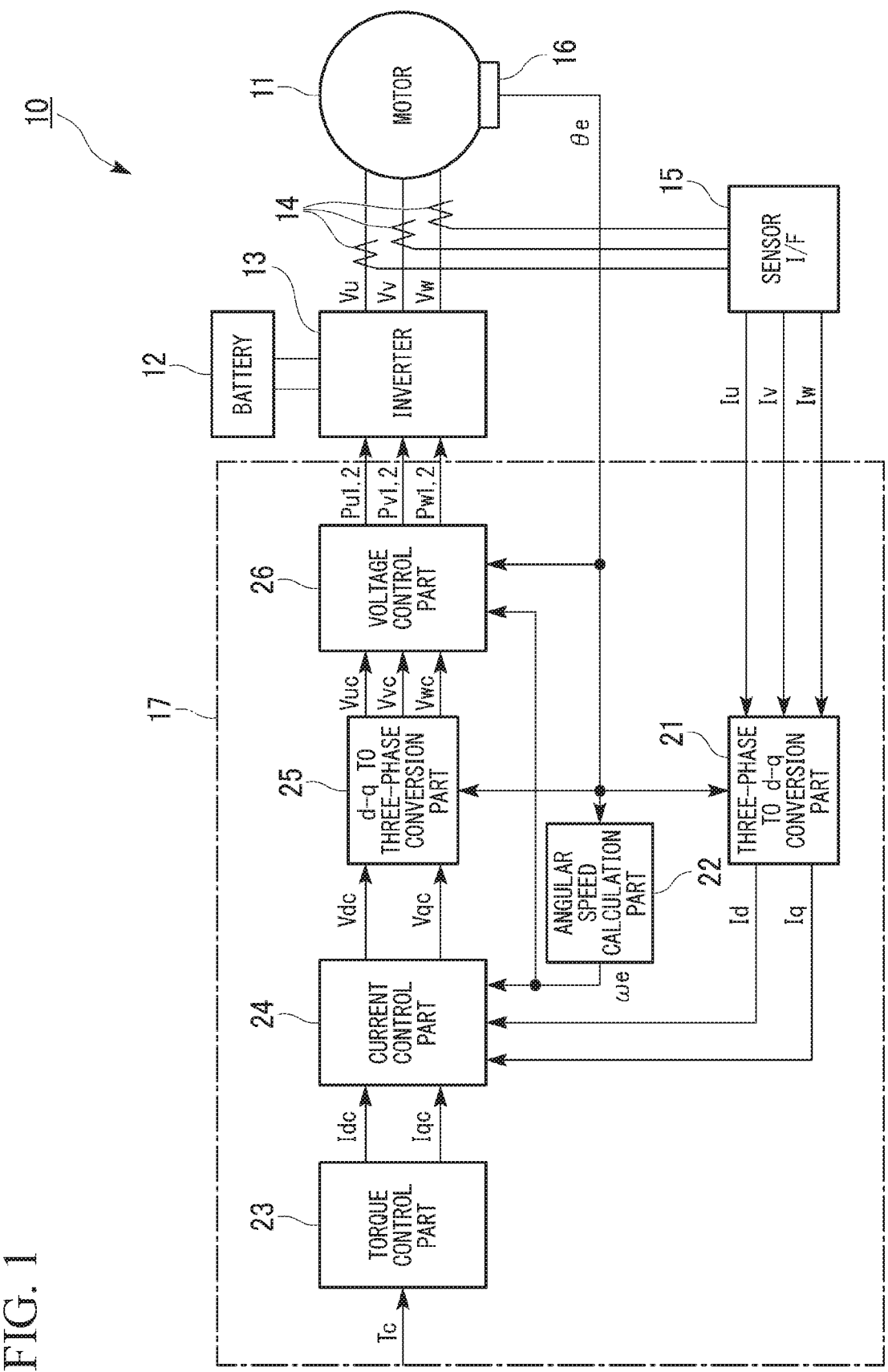
FIG. 1 is a block diagram showing an example of a functional configuration of a motor control apparatus according to an embodiment of the present invention.

FIG. 1 is a block diagram showing an example of a functional configuration of a motor control apparatus 10 according to the embodiment of the present invention.

The motor control apparatus 10 according to the embodiment controls, for example, an inverter 13 that performs an electric power supply/reception between a motor 11 and a battery 12. The motor 11, the battery 12, and the inverter 13 are mounted on an electric vehicle and the like. The electric vehicle includes an electric automobile, a hybrid vehicle, a fuel-cell vehicle, and the like. The battery 12 is mounted as a power source on the electric vehicle. The battery 12 and an internal combustion engine are mounted as a power source on the hybrid vehicle. A fuel cell is mounted as a power source on the fuel-cell vehicle.

The motor 11 is, for example, a three-phase AC brushless DC motor (hereinafter, simply referred to as the motor 11). The motor 11 includes a rotor (not shown) having a field permanent magnet and a stator (not shown) having a three-phase (U-phase, V-phase, and W-phase) stator winding wire (not shown) that generates a rotating magnetic field which rotates the rotor.

The inverter 13 uses the battery 12 as a DC electric source and is connected to the three-phase stator winding wire of the motor 11. The inverter 13 includes a bridge circuit which is formed of a plurality of switching elements that are mutually connected by bridge connection, a smoothing capacitor, and the like.

For example, the switching element is a transistor such as an IGBT (Insulated Gate Bipolar Transistor) or a MOSFET (Metal Oxide Semiconductor Field Effect Transistor). In the bridge circuit, each of high side arm and low side arm U-phase transistors UH, UL which form a pair, high side arm and low side arm V-phase transistors VH, VL which form a pair, and high side arm and low side arm W-phase transistors WH, WL which form a pair are connected by the bridge connection.

The bridge circuit switches between ON (conduction) and OFF (cutoff) states of the switching element which forms a pair at each phase on the basis of a switching command (gate signal) that is input to a gate of each switching element from the motor control apparatus 10. The bridge circuit converts a DC electric power that is supplied from the battery 12 into a three-phase AC electric power by the switching between ON and OFF of each switching element, sequentially switches power distribution to the three-phase stator winding wire, and thereby applies each of an AC U-phase voltage Vu, an AC V-phase voltage Vv, and an AC W-phase voltage Vw to the stator winding wire of each phase.

The smoothing capacitor is connected to and between positive and negative terminals of the battery 12. The smoothing capacitor smooths a voltage variation that occurs in accordance with an ON/OFF switching operation of each switching element of the bridge circuit.

The motor control apparatus 10 includes a plurality of (for example, three) current sensors 14, a sensor I/F (interface) 15, a rotation angle sensor 16, and a control unit 17.

The plurality of current sensors 14 detects a current of each phase of the three phases, that is, a U-phase current Iu, a V-phase current Iv, and a W-phase current Iw between the inverter 13 and the motor 11.

The sensor I/F (interface) 15 is connected to the plurality of current sensors 14 and allows a current detection value of each phase to be inputted to the control unit 17 on the basis of a detection signal that is output from each of the current sensors 14. The sensor I/F (interface) 15 may calculate, on the basis of detection signals that are output from two current sensors 14 which detect at least any two (for example, a U-phase current Iu and a V-phase current Iv) of three phase currents, a current value of another phase current (for example, a W-phase current Iw).

The rotation angle sensor 16 detects a rotation angle θe of the motor 11, that is, a rotation angle (electric angle) of a magnetic pole of the rotor from a predetermined reference rotation position.

The control unit 17 controls an operation of the inverter 13. For example, the control unit 17 is a software function part that functions by executing a predetermined program by a processor such as a CPU (Central Processing Unit). The software function part includes a processor such as a CPU, a ROM (Read Only Memory) that stores a program, a RAM (Random Access Memory) that temporarily stores data, and an ECU (Electronic Control Unit) that includes an electronic circuit such as a timer. At least part of the control unit 17 may be an integrated circuit such as a LSI (Large Scale Integration).

For example, the control unit 17 performs a current feedback control that uses a current detection value of the current sensor 14 and a current target value in response to a torque command value Tc with respect to the motor 11 and generates a control signal that is input to the inverter 13. The control signal is a pulse width modulation (PWM) signal in accordance with a duty ratio and a timing of the ON/OFF drive of each switching element of the inverter 13.

The control unit 17 performs a current feedback control (vector control) on a d-q coordinate that forms rotation orthogonal coordinates of the motor 11 on the basis of the rotation angle θe of the motor 11 that is output from the rotation angle sensor 16 as described below. The control unit 17 generates a d-axis current command value Idc and a q-axis current command value Iqc in accordance with the torque command value Tc and calculates U-phase, V-phase, and W-phase voltage command values Vuc, Vvc, Vwc on the basis of the current command values Idc, Iqc. The control unit 17 generates a PWM signal on the basis of the voltage command values Vuc, Vvc, Vwc. The control unit 17 converts the phase currents Iu, Iv, Iw that are actually supplied to the motor 11 from the inverter 13 onto the d-q coordinate on the basis of the detection signal that is output from the current sensors 14 and obtains a d-axis current Id and a q-axis current Iq. The control unit 17 performs a feedback control such that a deviation between the d-axis current Id and the d-axis current command value Idc and a deviation between the q-axis current Iq and the q-axis current command value Iqc become zero.

The control unit 17 includes a three-phase to d-q conversion part 21, an angular speed calculation part 22, a torque control part 23, a current control part 24, a d-q to three-phase conversion part 25, and a voltage control part 26.

The three-phase to d-q conversion part 21 converts the phase currents Iu, Iv, Iw into the d-axis current Id and the q-axis current Iq on the d-q coordinate on the basis of the current detection value that is output from the sensor I/F 15 by using the rotation angle θe of the motor 11 that is output from the rotation angle sensor 16.

The angular speed calculation part 22 calculates an angular speed ωe, that is, a rotation speed (electric angle) in accordance with the rotation angle θe of the motor 11 that is output from the rotation angle sensor 16.

The torque control part 23 calculates the q-axis current command value Iqc and the d-axis current command value Idc in accordance with the torque command value Tc that is externally input. The torque command value Tc may be calculated, for example, by a closed loop control using a rotation speed command value that is externally input and the angular speed ωe that is output from the angular speed calculation part 22 or the like.

The current control part 24 calculates a deviation ΔId between the d-axis current command value Idc that is output from the torque control part 23 and the d-axis current Id that is output from the three-phase to d-q conversion part 21 and calculates a deviation ΔIq between the q-axis current command value Iqc that is output from the torque control part 23 and the q-axis current Iq that is output from the three-phase to d-q conversion part 21. Then, by a PI (proportional integral) operation using the angular speed ωe that is output from the angular speed calculation part 22 or the like, a d-axis voltage command value Vdc is calculated by a controlled amplification of the deviation ΔId, and a q-axis voltage command value Vqc is calculated by a controlled amplification of the deviation ΔIq.

The d-q to three-phase conversion part 25 converts the d-axis voltage command value Vdc and the q-axis voltage command value Vqc on the d-q coordinate into the voltage command value on the three-phase AC coordinate as a rest coordinate, that is, a U-phase voltage command value Vuc, a V-phase voltage command value Vvc, and a W-phase voltage command value Vwc by using the rotation angle θe of the motor 11 that is output from the rotation angle sensor 16.

Figure 2:
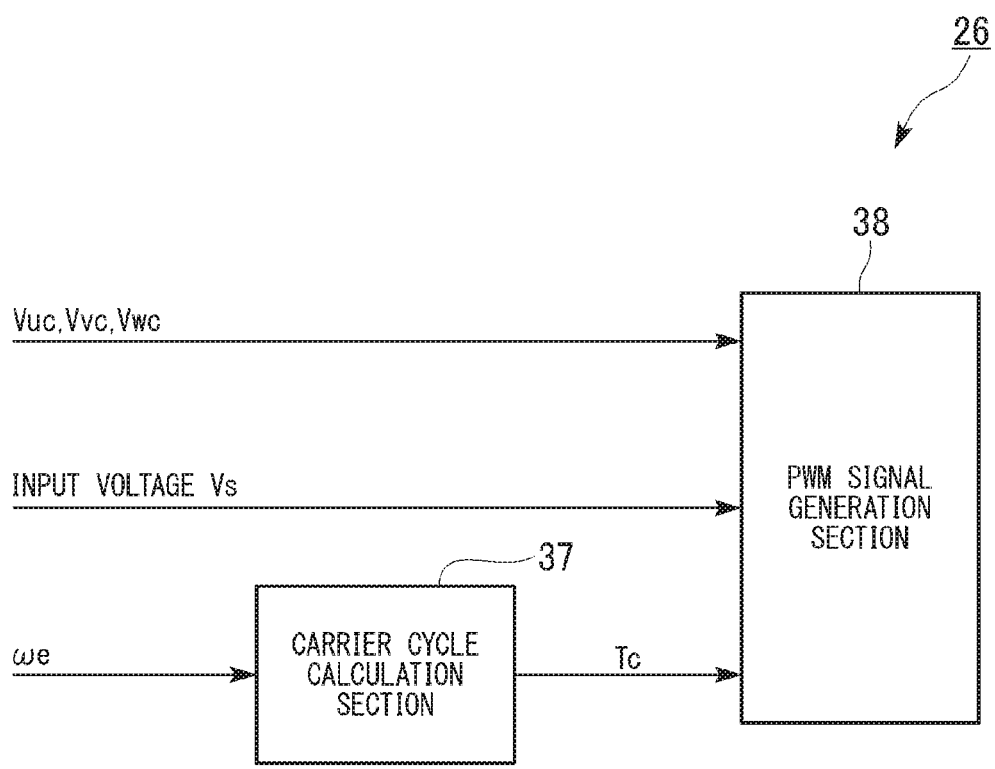
FIG. 2 is a block diagram showing an example of a functional configuration of a voltage control part shown in FIG. 1.

FIG. 2 is a block diagram showing an example of a functional configuration of the voltage control part 26 shown in FIG. 1.

The voltage control part 26 mainly includes a carrier cycle calculation section 37 (carrier frequency setting part) and a PWM signal generation section 38.

An input voltage Vs of the inverter 13 is a voltage that is applied from the battery 12 to the bridge circuit of the inverter 13 and is, for example, an output voltage of the battery 12 in a case where there is no voltage increase operation. The output voltage of the battery 12 is detected by, for example, a voltage sensor (not shown) that is connected between positive and negative terminals of the battery 12.

In a sinusoidal wave PWM control and an overmodulation PWM control, an amplitude and a phase of a voltage that is applied to the motor 11 are controlled by a feedback control with respect to a current of the motor 11.

The sinusoidal wave PWM control performs a pulse width modulation in a state where an amplitude of a sinusoidal voltage command value is equal to or less than an amplitude of the carrier, thereby maintains the linearity between the voltage command value and the PWM signal, and allows a line voltage of the motor 11 to be in a sinusoidal wave form.

The overmodulation PWM control performs pulse width modulation in a state where an amplitude of a sinusoidal voltage command value is more than an amplitude of the carrier, thereby accepts the non-linearity between the voltage command value and the PWM signal, distorts a line voltage of the motor 11 into a rectangular wave from a sinusoidal wave, and increases a voltage utilization rate.

In the sinusoidal wave PWM control and the overmodulation PWM control, even when a 3n-th order harmonic (n is an arbitrary natural number) is overlapped on a phase voltage waveform of the motor 11, the line voltage is not affected, and therefore, the 3n-th order harmonic may be overlapped on the sinusoidal voltage command value in order to increase the voltage utilization rate.

The carrier cycle calculation section 37 refers to a map of a PWM mode that is stored in advance and determines whether the control mode of the pulse width modulation (PWM) is either of a synchronous PWM control or an asynchronous PWM control on the basis of the angular speed ωe that is output from the angular speed calculation part 22. The carrier cycle calculation section 37 acquires a frequency fc of the carrier, a pulse number P, and the like of the carrier per one electric angle cycle in the output voltage value of the inverter 13 from the map of the PWM mode in response to the determination result of the control mode.

The map of the PWM mode is, for example, a map indicating a correspondence relationship between a rotation number of the motor 11 and the frequency fc of the carrier in each of the synchronous PWM control and the asynchronous PWM control. In the synchronous PWM control, the frequency fc of the carrier is controlled in response to (while being synchronized with) the rotation number of the motor 11. In the asynchronous PWM control, the frequency fc of the carrier is controlled regardless of (while not being synchronized with) the rotation number of the motor 11.

For example, the asynchronous PWM control is performed in a relatively low speed region in which the rotation number of the motor 11 is equal to or less than a predetermined rotation number, and the synchronous PWM control is performed in a relatively middle/high speed region in which the rotation number of the motor 11 is more than the predetermined rotation number.

In the asynchronous PWM control, for example, the frequency fc of the carrier is set to a relatively high value (for example, several kHz or the like) in order to ensure the response characteristic in the low speed region, reduce a ripple component, and the like, and the frequency fc of the carrier is fixed to a constant value in order to prevent a tone change accompanied by the switching of the pulse number P of the carrier.

In the synchronous PWM control, for example, the frequency fc of the carrier is changed in an increasing direction in accordance with the increase of the rotation number of the motor 11, and the pulse number P of the carrier is switched in a decreasing direction such that the frequency fc of the carrier does not exceed a predetermined upper limit value relating to a temperature increase and a switching loss of the inverter 13.

Figure 3A:
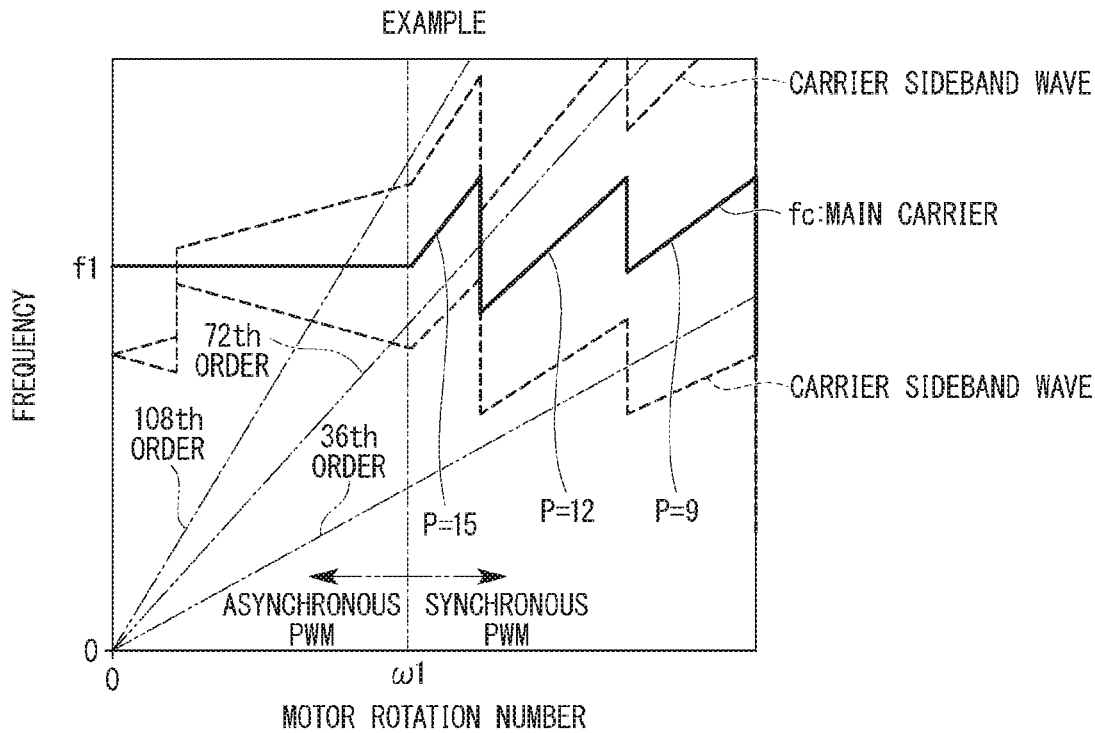
FIG. 3A is a view showing a map of a PWM mode of an example in a motor control apparatus according to the embodiment of the present invention.
Figure 3B:
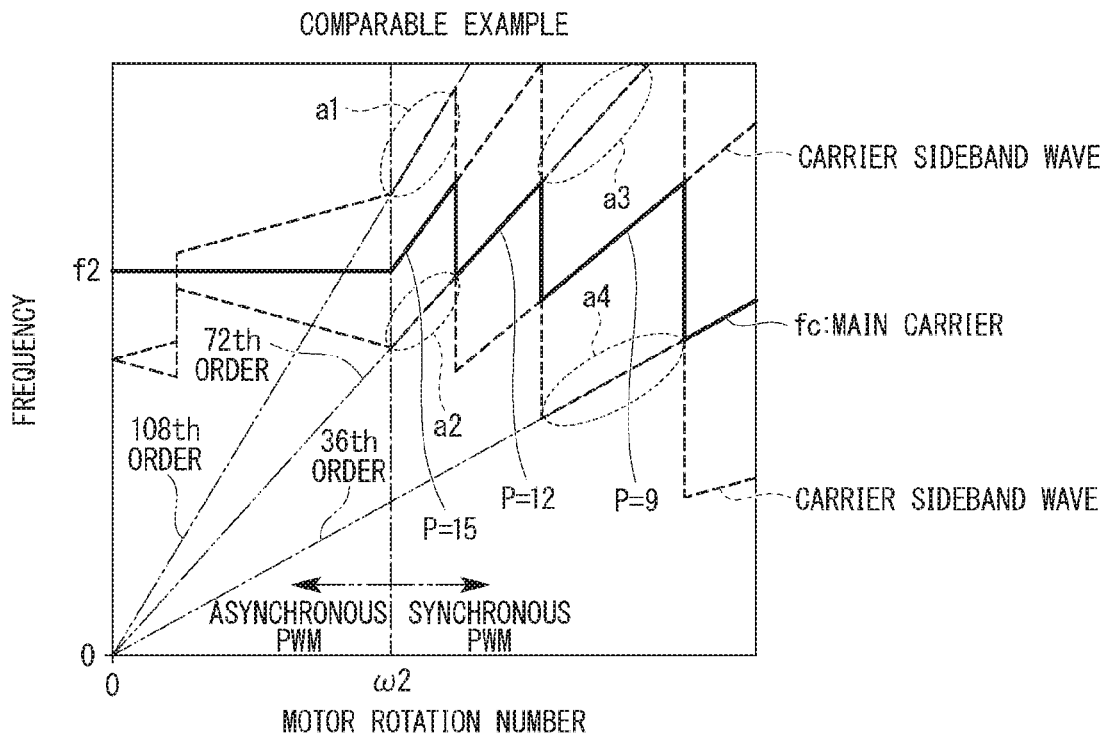
FIG. 3B is a view showing a map of a PWM mode of a comparable example.

FIG. 3A is a view showing a map of a PWM mode of an example in the motor control apparatus 10 according to the embodiment of the present invention. FIG. 3B is a view showing a map of a PWM mode of a comparable example.

In each of the example and the comparable example, each of a first predetermined rotation number ω1 and a second predetermined rotation number ω2 is a switching rotation number, the asynchronous PWM control is set in a region in which the rotation number of the motor 11 is equal to or less than the switching rotation number, and the synchronous PWM control is set in a region in which the rotation number of the motor 11 is more than the switching rotation number. In the asynchronous PWM control of the example, the frequency fc (a main carrier fc of FIG. 3A) of the carrier is set to a constant first frequency f1 regardless of the rotation number of the motor 11. In the asynchronous PWM control of the comparable example, the frequency fc (a main carrier fc of FIG. 3B) of the carrier is set to a constant second frequency f2 regardless of the rotation number of the motor 11. In the synchronous PWM control of each of the example and the comparable example, in accordance with the increase of the rotation number of the motor 11, the frequency fc of the carrier is set so as to be changed in an increasing trend, and the pulse number P of the carrier is set so as to be switched in a decreasing trend to P=15, P=12, and P=9 sequentially.

In the map of the PWM mode of the example, the frequency fc of the carrier is set such that the frequency of a carrier sideband wave and a frequency of a predetermined rotation order of the motor 11 become different from each other. The predetermined rotation order of the motor 11 is a rotation order (for example, a least common multiple of the number of magnetic poles and the number of slots, and the like) at which a torque ripple (torque pulsation) occurs in accordance with the number of magnetic poles and the number of slots of the motor 11. For example, the predetermined rotation order of the motor 11 is the 36th order, the 72th order, the 108th order, and the like shown in FIG. 3A and FIG. 3B.

On the other hand, in the map of the PWM mode of the comparable example, the frequency fc of the carrier is set such that there is a region in which the frequency of the carrier sideband wave and the frequency of the predetermined rotation order of the motor 11 are matched with each other. For example, in a first region a1, the frequency of the carrier sideband wave on the high frequency side at which the pulse number P is P=15 and the frequency of the 108th order of the rotation order of the motor 11 are matched with each other. In a second region a2, the frequency of the carrier sideband wave on the low frequency side at which the pulse number P is P=15 and the frequency of the 72th order of the rotation order of the motor 11 are matched with each other. In a third region a3, the frequency of the carrier sideband wave on the high frequency side at which the pulse number P is P=9 and the frequency of the 72th order of the rotation order of the motor 11 are matched with each other. In a fourth region a4, the frequency of the carrier sideband wave on the low frequency side at which the pulse number P is P=9 and the frequency of the 36th order of the rotation order of the motor 11 are matched with each other.

As in the comparable example, when the frequency of the rotation order at which the torque ripple (torque pulsation) of the motor 11 occurs and the frequency of the carrier sideband wave are matched with each other, a problem that noise is increased occurs. On the other hand, in the example, the frequency of the rotation order at which the torque ripple (torque pulsation) of the motor 11 occurs and the frequency of the carrier sideband wave are set to become different from each other, and thereby, the increase of the noise is prevented.

The carrier cycle calculation section 37 performs the synchronous PWM control or the asynchronous PWM control in response to the determination result of the control mode.

In each of the synchronous PWM control and the asynchronous PWM control, a cycle Tc of the carrier that is synchronized with the phase of each of the phase voltage command values Vuc, Vvc, Vwc is calculated on the basis of the rotation angle θe of the motor 11 that is output from the rotation angle sensor 16, the angular speed ωe that is output from the angular speed calculation part 22, the pulse number P of the carrier, the frequency fc of the carrier, and the like.

The PWM signal generation section 38 generates PWM signals Pu1, Pu2, Pv1, Pv2, Pw1, Pw2 on the basis of a triangular wave carrier in accordance with the cycle Tc of the carrier that is output from the carrier cycle calculation section 37 and the like. The PWM signals Pu1, Pu2, Pv1, Pv2, Pw1, Pw2 are gate signals that perform a ON/OFF drive of each of the switching elements (that is, transistors of the high side arm and the low side arm of each phase) which form a pair in each phase of the bridge circuit of the inverter 13.

As described above, according to the motor control apparatus 10 of the present embodiment, it is possible to prevent noise caused by the frequency of the sideband wave component of the carrier and the frequency of the predetermined rotation order of the motor 11 being matched with each other from being increased. Further, it is possible to prevent noise caused by the torque ripple that occurs in accordance with the number of magnetic poles and the number of slots of the motor 11 from being increased. Furthermore, it is possible to further effectively prevent noise from being increased in the synchronous PWM control in which the frequency of the sideband wave component of the carrier and the frequency of the predetermined rotation order of the motor 11 are easily matched with each other.

The above embodiment is described using an example in which the motor control apparatus 10 is mounted on a vehicle; however, the embodiment is not limited thereto. The motor control apparatus 10 may be mounted on another apparatus.

The embodiment of the present invention is described as an example, and the invention is not limited to the embodiment. The embodiment can be implemented as a variety of other embodiments, and a variety of omissions, replacements, and changes can be made without departing from the scope of the invention. The embodiment and the modifications are included in the scope of the invention and also included in the invention described in the claims and equivalents thereof.

What is claimed is:

1. A motor control apparatus that drives an inverter which supplies and receives electric power with respect to a motor by pulse width modulation, the motor control apparatus comprising
    a carrier frequency setting part that sets a frequency of a carrier such that a frequency of a sideband wave component of the carrier which is used for the pulse width modulation and a frequency of a predetermined rotation order of the motor become different from each other,
    wherein the predetermined rotation order is a rotation order at which a torque ripple occurs at the motor in accordance with a number of magnetic poles and a number of slots of the motor.

2. The motor control apparatus according to claim 1,
    wherein the carrier frequency setting part sets, in a state where the frequency of the carrier is changed synchronously with a rotation number of the motor, the frequency of the carrier such that the frequency of the sideband wave component and the frequency of the predetermined rotation order become different from each other.

3. A motor control apparatus that drives an inverter which supplies and receives electric power with respect to a motor by pulse width modulation, the motor control apparatus comprising
    a carrier frequency setting part that sets a frequency of a carrier such that a frequency of a sideband wave component of the carrier which is used for the pulse width modulation and a frequency of a predetermined rotation order of the motor become different from each other,
    wherein the carrier frequency setting part sets, in a state where the frequency of the carrier is changed synchronously with a rotation number of the motor, the frequency of the carrier such that the frequency of the sideband wave component and the frequency of the predetermined rotation order become different from each other.

4. The motor control apparatus according to claim 3,
    wherein the predetermined rotation order is a rotation order at which a torque ripple occurs at the motor in accordance with a number of magnetic poles and a number of slots of the motor.

* * * * *